Figure 1:
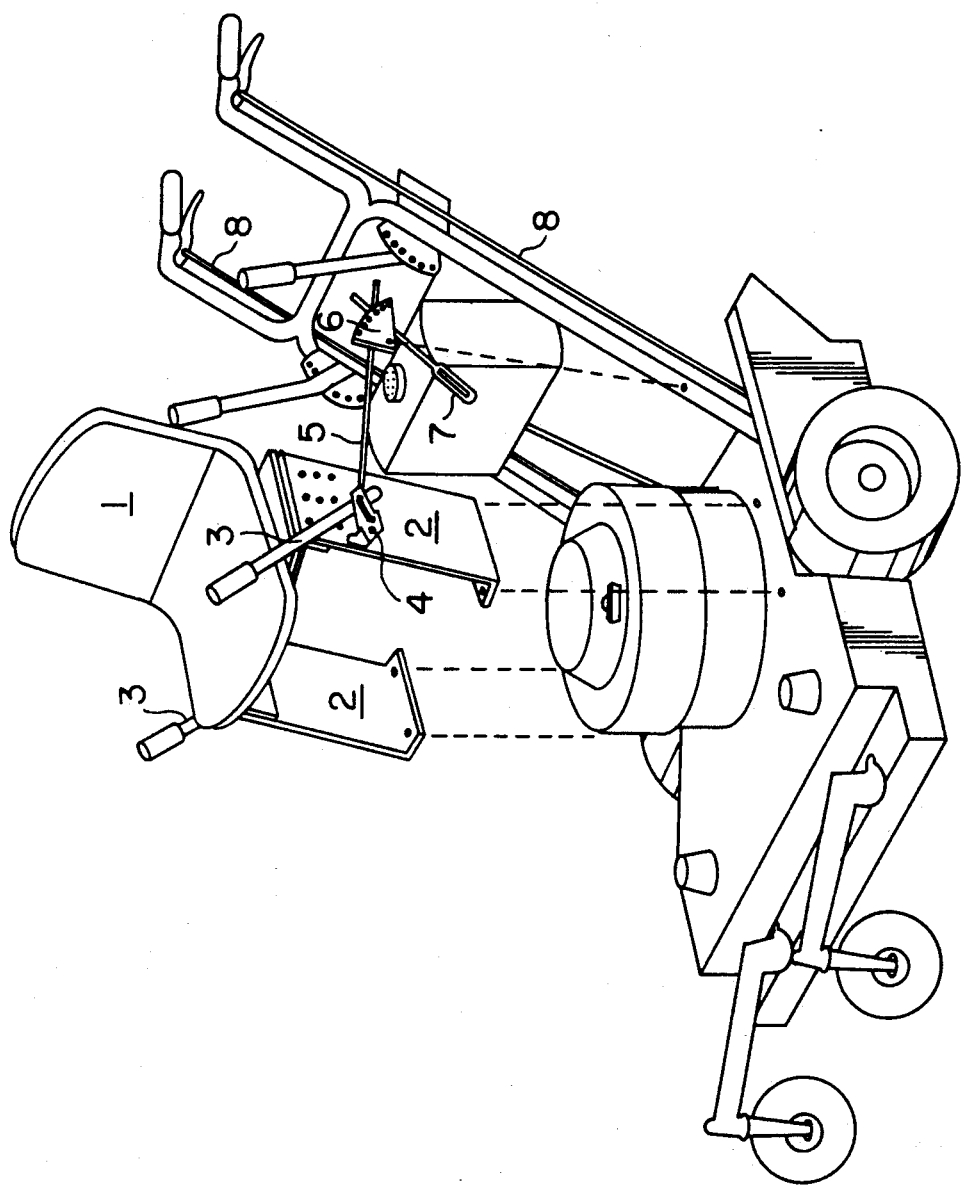

United States Patent [19]
Gugel

[11] Patent Number: 5,239,810
[45] Date of Patent: Aug. 31, 1993

[54] CENTRALLY MOUNTED DRIVER CARRIER CONTROL UNIT

[76] Inventor: Leslie H. Gugel, 16697 121st Ter. N., Jupiter, Fla. 33478

[21] Appl. No.: 510,665

[22] Filed: Mar. 29, 1990

[51] Int. Cl.[5] ............................................. A01D 69/00
[52] U.S. Cl. ......................................... 56/10.8; 56/17.5
[58] Field of Search ............... 56/2, 16.7, 17.5, 320.1, 56/1, 12.7, 14.8, 201, 202, 203, 252, DIG. 9, DIG. 13, DIG. 22, 10.8

[56] References Cited

FOREIGN PATENT DOCUMENTS 1395661 5/1975 United Kingdom ................ 56/16.7

*Primary Examiner*—Ramon S. Britts
*Assistant Examiner*—Roger J. Schoeppel

[57] ABSTRACT

In reference to a grass cutting machine of the kind comprising a self-propelling device supported on four wheels rotatably mounted to rotate around a common axis and supporting a chassis carrying a power source and provided with rigid or adjustable rearwardly extending handle bars and rigid or adjustable forwardly extending means for a cutter device comprising a housing accomodating at least one cutter, a device consisting of a rigidly affixed, or adjustable seat housing with adjustable handlebars, which is to be positioned above the power source, parallel in line with the common axis, and attached directly to the steering linkage thereby allowing the operator greater maneuverability by providing operation from with-in the center of gravity without deterring from the original intended purpose of the machine itself.

8 Claims, 6 Drawing Sheets

CENTRALLY MOUNTED DRIVER CARRIER CONTROL UNIT

BACKGROUND

1. The technical field to which this device pertains would fall within the definition of improvements in grass cutting devices, which is the title of Great Britain Patent #1395661.

2. This patent discribes a lawn cutting device designed to carry a two-wheeled trailer driver carrier unit being pivotally connected to a rearwardly extended part of the chassis. A problem encountered with the driver carrier unit described is that when attached to the lawn cutting device, there is created two separate centers of gravity, one around a common axis supporting the main power source and one around a common axis supporting the driver. By having two centers of gravity, as opposed to one, certain maneuvers become impossible to perform, such as full 360 degree turns. Another problem encountered is in the method of attachment. The driver-carrier unit has to be pivotally connected in order to afford maneuverability. Unfortunately, the method of connection creates a pressure point between the operator and the machine itself. As previously noted in the Great Britain Patent, substantially no vertical forces are exerted on the self-propelling unit while in use. This would also be true of the point of connection at which the driver-carrier unit is attached to a rearwardly extended part of the chassis. However, in reference to the point of connection, this is only so when the unit is operated in a strictly horizontal plane. When an inclined plane is encountered, (as a hill or depression), an undue amount of stress is exerted upon the connecting point since the operator and machine will not be at the same level, (which is also attributable to the fact that there are two centers of gravity and not one). This undue amount of stress could result in damage to the connecting point which may lead to the driver carrier unit becoming disconnected from the cutting unit, which could result in damage to driver, the cutting machine, or both.

BRIEF DESCRIPTION

FIG. 1 shows an overall view of the centrally mounted driver-carrier control unit and the means in which it is to be attached to a grass-cutting machine as previously described. This unit consists of a two-part collapsable seat #1, the five piece seat bracket assembly #2, two control levers #3, two lever rod locking devices #4, two lever rods #5, two adjustable control devices #6, and two adjustable control rods. Although they are not a part of the invention, the hand control rods are shown in this figure and are numbered #8. The hand control rods are not essential to the operation of a grass-cutting machine equipped with a control unit of the type described herein.

Figure 2:
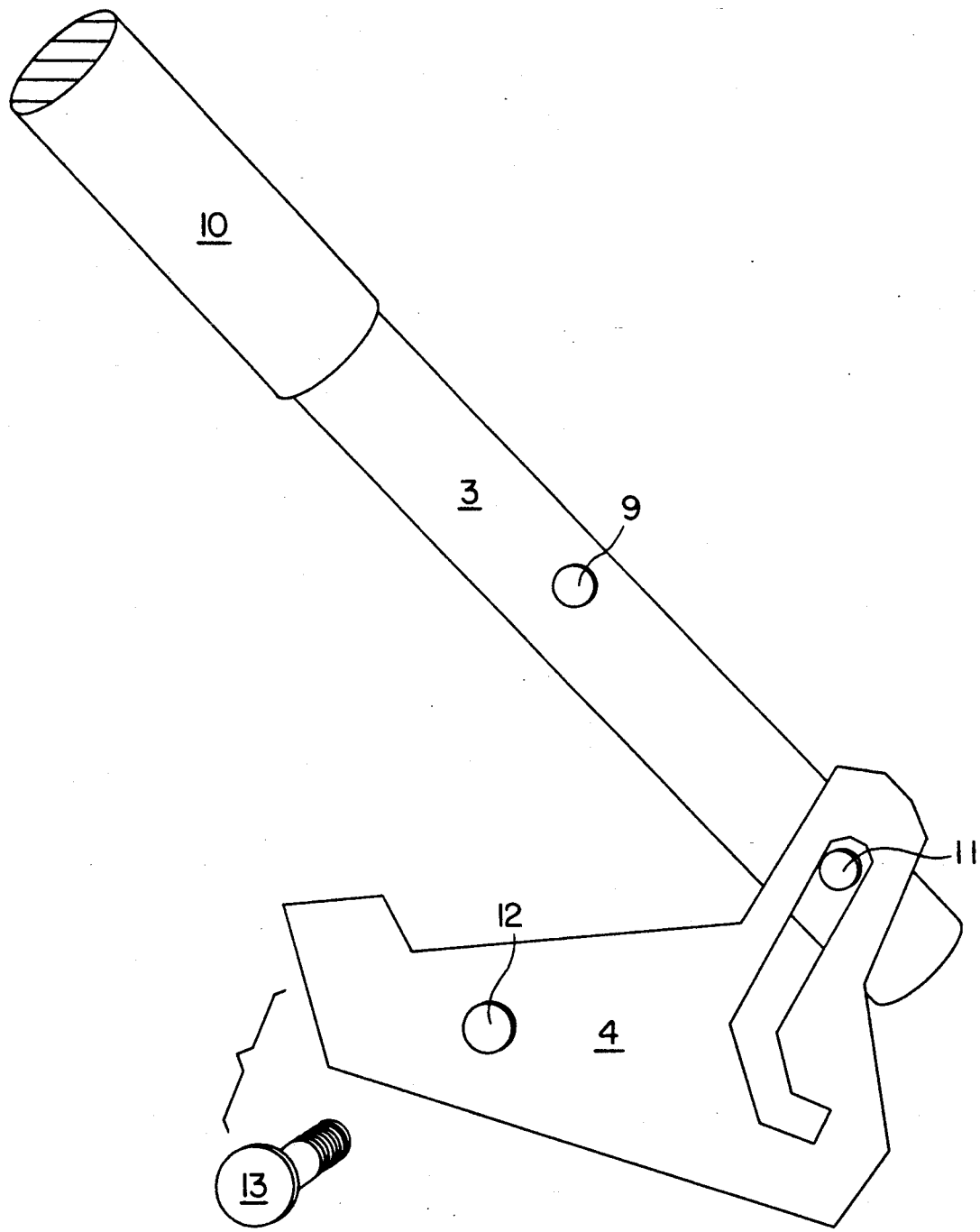
Figure 3:
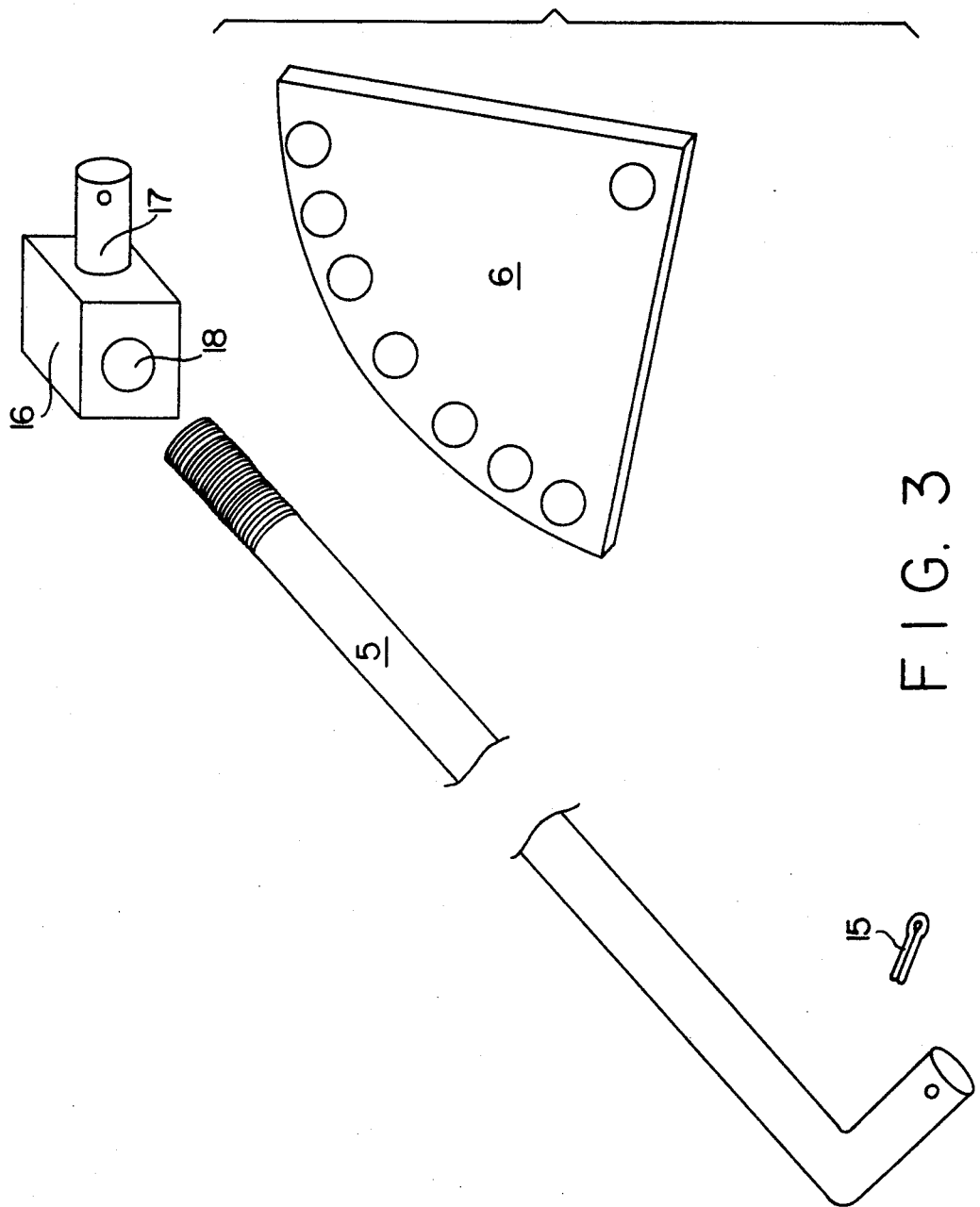

FIG. 2, is a side view of a control lever #3 showing it in the operating position. The lever is to be constructed as a 16 in. rod 1 in. in diameter with a ⅜ in hole #9 drilled 4 in. from the bottom. A rubber handle grip #10 is to be positioned at top end of the rod. At the opposite end a 5/16 in. hole #11 is drilled ½ in. from bottom to accomodate the lever rod #5. The ¼ in. hole #12 in the lever rod locking device #4 is to be drilled ½ in. from the upper ridge of the lever rod locking device. This is done to accomodate the retaining screw #13 which affixes the lever rod locking device in place to the seat bracket assembly. FIG. 3 is a side view showing the lever rod #5 which is an "L" shaped rod. This rod is to be constructed to be 19 in. long, 5/16 in. in diameter with the threading extending in 7 in. from one end. The opposite end of the rod is to be bent at a 90 degree angle exactly 1 in. from that end, with a ⅛ in. hole drilled through the bar ¼ in. from that end to accomodate a cotter pin #15 which locks the bar into place once it is inserted through the control lever hole #11 and the lever rod locking device #4. The adjustable pin #16 is a cubic piece of metal ½ inches by ½ in. by ½ in. with a cylindrical attachment #17 on one side. This attachment is ¼ in. in diameter ⅜ in. long. This attachment is to have a ⅛ in. hole #19 drilled through the bar ¼ in. from its tip to accomodate a cotter pin #15. There is to be drilled through the adjustable pin unit #16 a 5/16 in. hole with standard threading, its path to run perpendicular with that of the cylindrical attachment #17. This allows for the pin #16 to be moved at random along the threaded end of the lever rod to vary the distance from the lever rod locking device #4 to the adjustable control device #6. The adjustable control device #6 is an triangular piece of metal 4 in. long by 4 in. by 5¼ in. wide with one side convex, that side having 5 holes 5/16 in. in diameter 1 in. apart, and ½ in. from the outer edge. From center to center holes measure 1¼ in and one ⅜ hole opposite from them at the apex of the triangle. The apex of the triangle is to be mounted to the cutting machine by removing the upper bolt where the handle attaches to the cutting machine, and inserting 2½×⅜ in. bolt and 3 nuts, one for adjusting and two for tightning.

Figure 4:
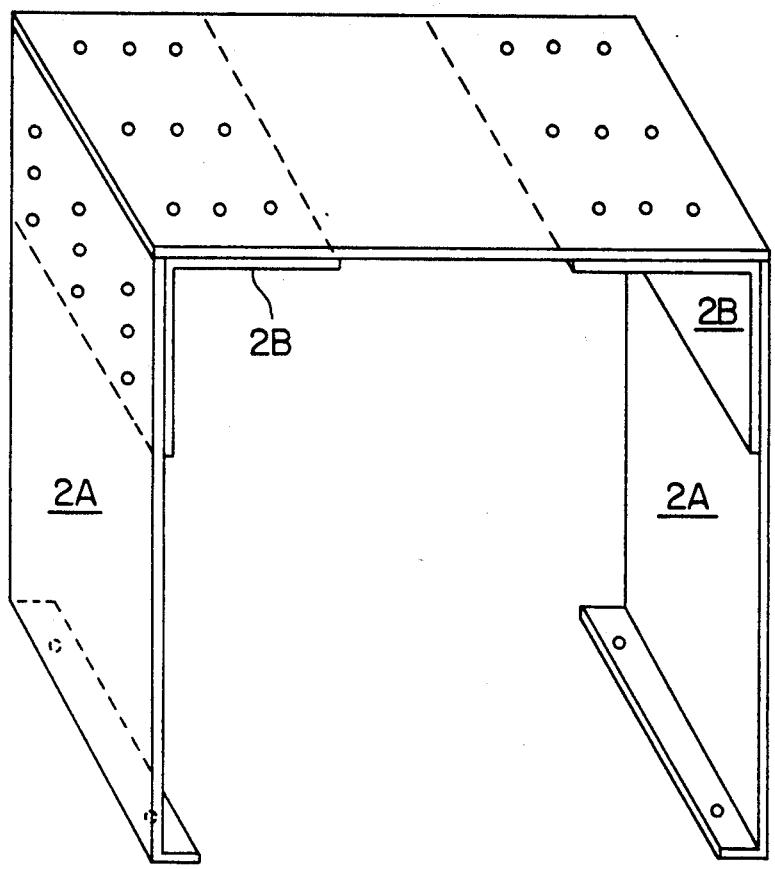

FIG. 4 is a front view of the seat bracket assembly #2 showing how the seat bracket #2 attaches to the sidebrackets #2-a by means of two angle brackets #2-b. The seat bracket #2 is a 19 in. by 5 in. piece of metal with nine holes drilled in rows of three: first row 1 in. from each end and the second row 2 in. from the first row and the third row 2 in. from the second row. The holes are spaced 1 in. apart and are 1 in. from each side. The angle iron brackets #2-b are of the same thickness. These dimensions are to be 6 in. by 5 in. rectangular bent in the center at 90 degrees. The holes are to be of the same size and drilled in the same configuration as the seat bracket so as to be compatible with the rest of the seat bracket assembly. The side brackets #2-a are "L" shaped metal 5 in. by 19 in. rectangular with one end bent at a 90 degree angle forming a "L" shape. This end should be bent 2 in. from the edge. Two holes are to be drilled 1 in. from the sides and 1 in. from the edge to allow the brackets to be mounted to the grass cutting machine. The other end is to contain nine holes drilled in the same configuration as previously described. This allows for maximum adjustability to accomodate for any engine size.

Figure 5:
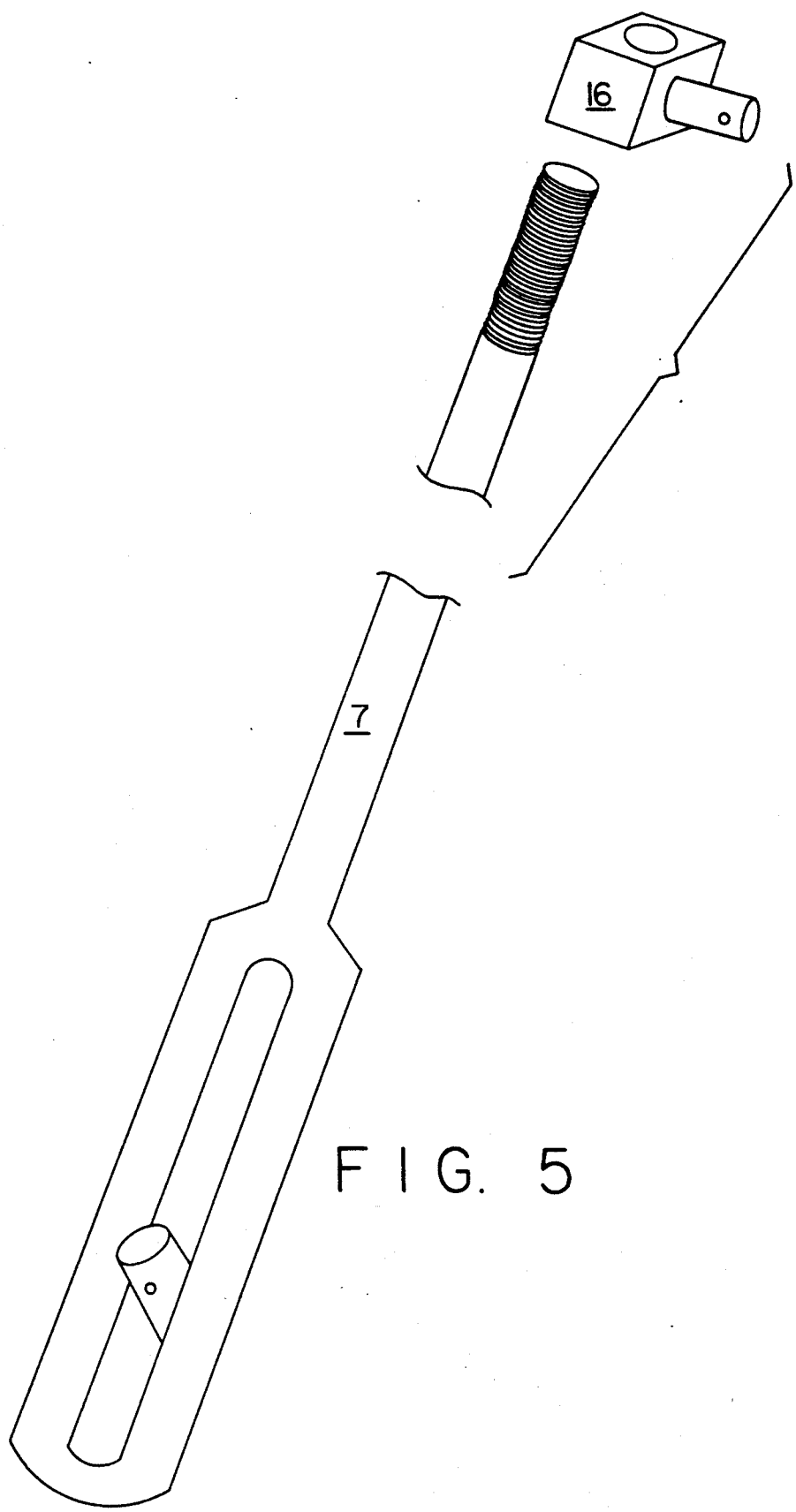

FIG. 5 is a side view of the adjustable control rod #7 which is in. by ½ in. The control rod itself is 9 in. long with 5 in. threading extending along the straight end 4 in. from the tip. This end is threaded to allow insertion of an adjustable pin #16 as previously described, to be attached to the adjustable control device. The oval end of the adjustable control rod is to be attached to the rear wheel drive pully and brake tightner and release device (bell-crank), by means of the control rod #8 which is inserted through the two, and kept secure by a cotter pin. The adjustable control device, lever rod, and adjustable control rod assemblies were designed to be made compatible to any system therefore eliminating the need to manufacture several different sized units.

Figure 6:
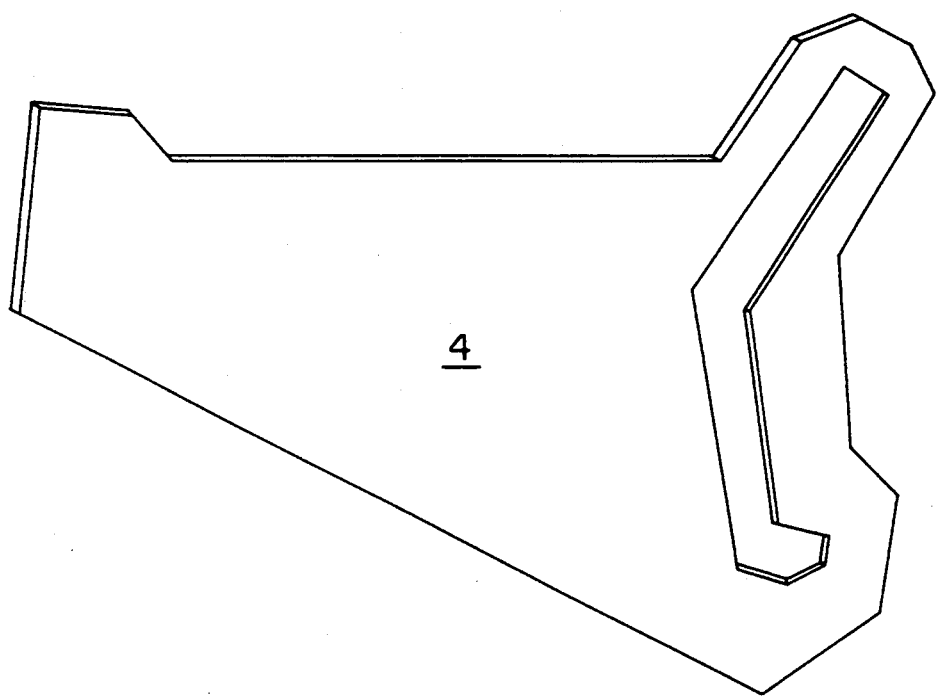

FIG. 6 shows the exact specifications of the lever rod locking device #4. This device allows the operator to lock the machine in neutral while the engine is still running. Let it be also understood that although I have described this particular prototype with certain specifications that these specifications as well as this description shall not be construed as limiting the ways in which this invention may be practiced, but shall be inclusive of many other variations that do not depart from the broad interest and intent of the invention.

BEST MODE FOR CARRYING OUT THE INVENTION

This device consists of a seat, which can either be collapsible or rigid, affixed to a rectangular section of metal attached to a five-piece bracket assembly designed to be adjusted manually to the operators specifications. The seat is mounted with ⅜ in. bolts securing the seat to the housing through seat mounting bracket and ⅜ in. hole drilled through the center of the cross-bar on top of the rectangular seat housing. The rectangular housing is to be mounted over the engine in line with the main axis of the wheels. In addition to the seat, levers are attached on the left and right side of the seat bracket, so as to provide forward and backward motion. Attached to the levers is the linkage system which consists of two adjustable rods which are connected to pivotal triangular device which mounts to the grass cutting unit. One free end of the linkage system hooks up to the lever bottom, while the other free end attaches to the cutting machines rear wheel drive pully, brake tightner, and release device (bell-crank).

SUMMARY

This device is a driver carrier unit which consists of a seat and seat housing (or seat bracket assembly as described herein) and a control unit consisting of two control levers attached to the seat housing pivotally hooked in line to the cutting machines steering mechanism by means of a linkage system which is a four part system and is mentioned in greater detail here-in. The advantage to this device is two-fold. First by being centrally located over a common axis at the power source and by having the control levers connected in line with the grass cutting machines steering mechanism, the need for a driver-carrier unit behind the grass cutting machine is eliminated, thereby creating one center of gravity and allowing complete maneuverability (360 degrees). Secondly, by being affixed in line with the common axis above the wheels, no pressure point is encountered when approaching an incline. This adds to increased efficiency.

I claim:

1. A driver carrier control unit for mounting onto a self-propelled walk-behind lawn mower to provide the operator the option of riding or walking, said control unit comprising:
   (a) a seat and bracket assembly mountable over an engine of a lawn mower and including mounting means for attaching the seat to the mower, and
   (b) control levers carried by the seat and bracket assembly and having means thereon for being operatively attached to the controls of the mower so as to enable a riding operator to conveniently control the speed and direction of the lawn mower.

2. The driver carrier control unit of claim 1 wherein the seat is vertically adjustable.

3. The driver carrier control unit of claims 1 or 2 wherein the control levers may be locked into neutral position while the engine in running.

4. The driver carrier control unit of claims 1 or 2. wherein the control levers are formed with threads and adjustable pin settings to allow the adaptation for different shapes of walk-behind lawn mowers.

5. The driver carrier control unit of claims 1 or 2 wherein the control levers engage propelling means which allow the turning of the mower in a 360 degree direction.

6. The driver carrier control unit of claims 1 or 2 wherein the control levers are mounted to the bracket assembly so as to not interfere with the operation of the lawn mower when operated from a walk-behind position.

7. An engine driven self-propelled lawn mower comprising an operator seat assembly fixedly mounted over an engine thereof and having alternate control levers carried by said seat assembly, said alternate control levers including means thereon operatively attached to the controls of the mower so as to enable the operator the option of walking behind or riding when the mower is being operated.

8. The method of converting a walk-behind self-propelled lawn mower to a riding mower comprising the steps of fixedly mounting an operator seat assembly over an engine, securing alternate control levers to said seat assembly and operatively attaching said alternate control levers to the controls of the mower so as to allow the operator the option of either walking behind or riding the mower while it is being operated, the control levers being conveniently located in either operating position so as to allow control of the speed and direction of the lawn mower.

* * * * *